United States Patent

[11] 3,582,544

[72] Inventor Steven Wlasuk
Blackwood, N.J.
[21] Appl. No. 794,960
[22] Filed Jan. 29, 1969
[45] Patented June 1, 1971
[73] Assignee RCA Corporation

[54] TEST SIGNAL GENERATOR FOR PRODUCING TEST PATTERNS FOR A TELEVISION RECEIVER
9 Claims, 1 Drawing Fig.

[52] U.S. Cl. .......... 178/6.8, 328/188
[51] Int. Cl. .......... H04m 5/24
[50] Field of Search .......... 178/6 TT, 5.4 (10), 5.4 TE; 328/188

[56] References Cited
UNITED STATES PATENTS

| | | | |
|---|---|---|---|
| 3,019,289 | 1/1962 | Machlis .......... | 178/5.4(10) |
| 3,404,222 | 10/1968 | Rupley .......... | 178/5.4TE |

*Primary Examiner*—Robert L. Griffin
*Assistant Examiner*—Donald E. Stout
*Attorney*—Eugene M. Whitacre

ABSTRACT: Test signal-generating apparatus for producing test patterns for a television receiver. Pulse trains are produced at integral multiples of television horizontal and vertical scanning rates and are supplied to a coincidence circuit. A diode coupled across the antenna input terminals of the receiver and arranged to be nonconductive for received broadcast signals is rendered conductive by an output from the coincidence circuit.

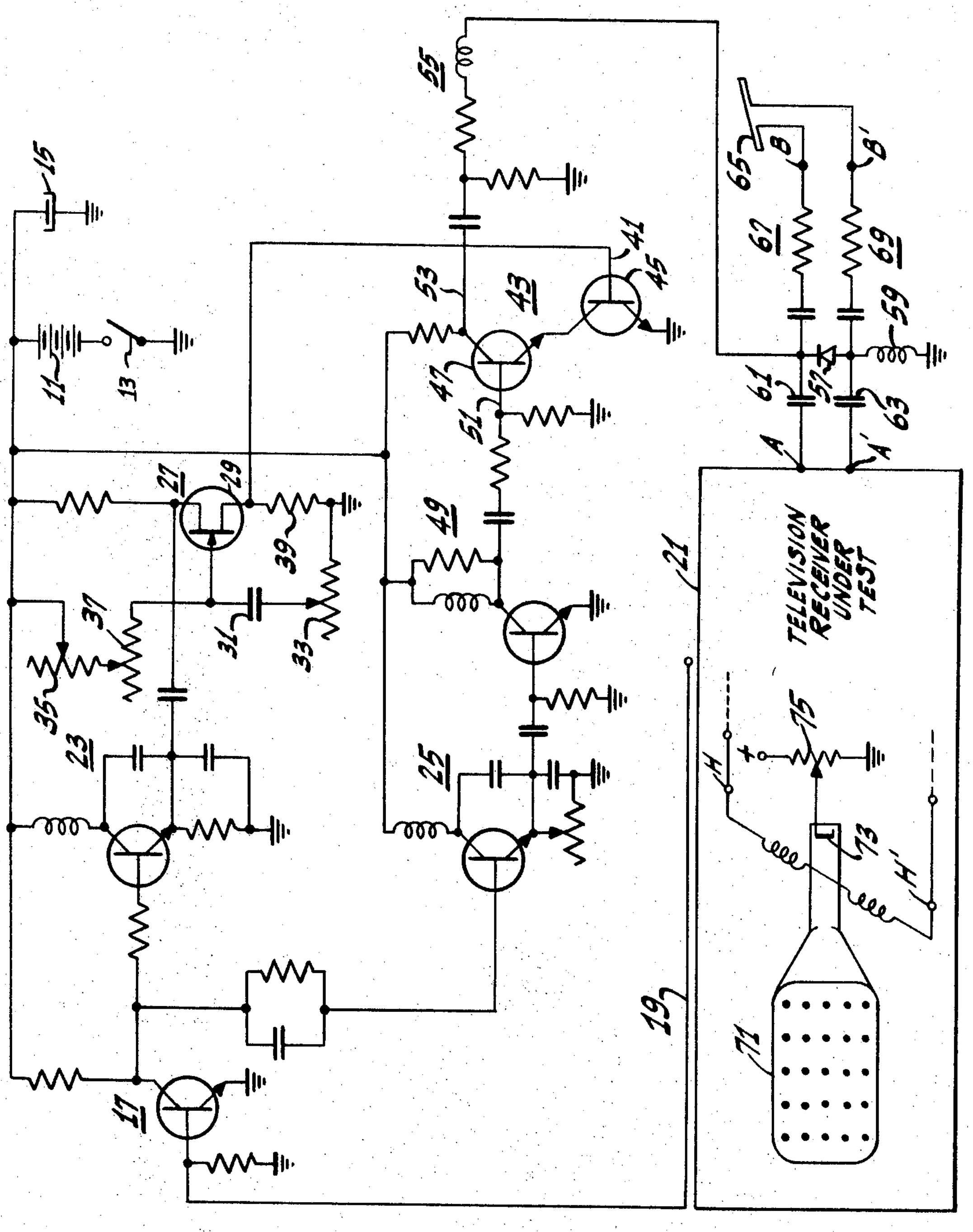
INVENTOR
STEVEN WLASUK
BY Kenneth R. Schaefer
ATTORNEY

TEST SIGNAL GENERATOR FOR PRODUCING TEST PATTERNS FOR A TELEVISION RECEIVER

This invention relates to test apparatus for television equipment and, in particular, to a signal generator useful for convergence adjustment of a color television receiver.

Servicing of color television receivers frequently requires the use of special signal-generating apparatus for producing video test patterns such as an array of white dots or small rectangles disposed in a regular pattern on the image-reproducing device of a television receiver. Such a pattern is useful for checking and correctly adjusting electron beam convergence apparatus in the receiver under test.

It is desirable that this test apparatus be lightweight, portable, reliable and capable of producing stable video patterns without the need for costly and complex circuitry or complex connections internal to the receiver under test. In keeping with the requirement of portability it is desirable that such equipment operate at a low power level from a battery voltage supply.

Heretofore, several different types of test signal generators capable of producing dot patterns have been proposed or actually used, some examples of which are described in my U.S. Pat. application Ser. No. 701,729 filed Jan. 30, 1968, entitled "Test Signal Generator" and U.S. Pat. No. 2,978,540 entitled "Television Test Apparatus" granted Apr. 4, 1961 to R. S. Coate and S. Koren, each of which is assigned to the same assignee as the present invention.

Test generators for producing dot patterns may be separated into two general categories. A first category provides modulated radio frequency (R.F.) signals for application to the tuner of a receiver while the second category provides video signals for application to the internal video amplifier or image-reproducing device of the receiver under test.

In the first case, in general, complete composite television signals including internally generated horizontal and vertical synchronizing components, video image-representative components and a radio frequency carrier corresponding to a particular television broadcast channel carrier are developed in the generator. Such an arrangement requires a substantial number of circuit components within the generator. In operation the generator is coupled to the antenna input terminals of the receiver under test while the receiver is tuned to an unused channel and/or the antenna is disconnected so that the receiver may respond only to the test signal.

In the second category of generators, synchronizing signals may be produced by the generator, or as in the above-mentioned U.S. Pat. of Coate et al., synchronizing signals may be derived from the receiver under test by tuning such receiver to an operating television channel. The video signals produced by the test generator must be of sufficient amplitude to drive the video circuits or kinescope of the receiver directly (e.g. up to the order of 100 volts depending upon the particular receiver and point of application of the test signal) and a connection must be made to circuit elements internal to the receiver.

In accordance with the present invention, a test signal generator for producing a video test pattern such as an array of small bright dots derives horizontal synchronizing signals from an operating receiver under test. The generator produces from such synchronizing signals a first signal component at a multiple of the vertical synchronizing frequency and a second signal component at a multiple of the horizontal synchronizing frequency. The generator is arranged to produce an output signal upon the simultaneous occurrence of the first and second components and such output signal is applied to a switching means such as a diode. The switching means is coupled across the antenna input terminals of a receiver under test and is rendered conductive by the above-mentioned output signal. The receiver is tuned to an operating television channel. The input terminals are shorted periodically by the conducting switching means. An intermittent, high brightness signal component is therefor superimposed upon the received signal so as to produce an array of white dots on the image reproducing device of the receiver.

The novel features that are considered characteristic of this invention are set forth with particularity in the appended claims. The invention itself, however, both as to its organization and method of operation as well as additional objects thereof, will best be understood from the following description when read in connection with the accompanying drawing which illustrates, partially in block diagram and partially in schematic circuit diagram form, a test signal generator constructed in accordance with the present invention arranged to operate with a television receiver.

Referring to the drawing, the illustrated test signal-generating apparatus utilizes solid state devices for all active elements. All such elements are supplied with operating voltage by means of a battery supply 11 (e.g. +4.2 volts). An on-off switch 13 is provided to preserve the life of the battery 11 when not in use.

The battery 11 is bypassed by means of a filter capacitor 15. A pulse amplifier 17 is arranged to amplify television horizontal synchronizing pulses provided via an input lead 19 by an associated television receiver 21. Amplified horizontal synchronizing pulses are supplied by amplifier 17 to first and second oscillators 23 and 25. Each of oscillators 23 and 25 is illustrated as a Colpitts oscillator.

First oscillator 23 provides a train of pulses at an even harmonic (e.g. second harmonic) of the television horizontal synchronizing frequency. The output of oscillator 23 is coupled to a frequency divider stage 27 arranged to produce a train of output pulses at a frequency less than the horizontal synchronizing frequency and equal to an integral multiple of the television vertical synchronizing frequency (e.g. divider stage 27 provides one output pulse for each 35th input pulse). Frequency divider 27 comprises a unijunction transistor (UJT) 29 having first and second base electrodes and an emitter electrode designated in the conventional manner in the drawing. UJT 29 is arranged as a triggered relaxation oscillator with the triggering pulses being supplied by oscillator 23 to the second base electrode of UJT 29. A capacitor 31 is coupled between the emitter electrode of UJT 29 and a voltage reference point (e.g. ground) by means of a variable resistance pulse width control 33. Charging current is supplied to capacitor 31 from battery 11 by means of the series combination of a variable resistance coarse frequency (or frequency range) control 35 and a variable resistance fine frequency control 37. Typically, control 35 is internal to the generator (factory adjustment) while control 37 is panel mounted (user adjustment). Output pulses are developed across a resistor 39 coupled between the first base electrode of UJT 29 and ground. The output pulses produced across resistor 39 are coupled to one input terminal 41 of an "AND" or coincidence circuit 43 comprising first and second switching transistors 45 and 47, respectively.

Pulse amplifier 17 also provides horizontal synchronizing pulses to second oscillator 25. Oscillator 25 is arranged to produce a train of output pulses at an integral (e.g. 12th multiple of and in timed relation with the applied horizontal synchronizing pulses. The output train of pulses provided by oscillator 25 is shaped and amplified by means of an amplifier 49, the output of which, in turn is supplied to a second input terminal 51 of "AND" circuit 43. AND circuit 43 is arranged to produce an output pulse at terminal 53 upon the simultaneous occurrence of pulses at input terminals 41 and 57. Output terminal 53 is coupled by means of a pulse-shaping network 55 to one electrode (e.g. cathode) of a diode 57. The other electrode (e.g. anode) of diode 57 is returned to a DC reference voltage (ground) by means of an inductive impedance 59. Each of the electrodes of diode 57 is coupled by means of a separate capacitor 61, 63 to one antenna terminal A, A′ of the television receiver 21 which is to be tested. Terminals B, B′ of a television signal-receiving antenna 65 are coupled by means of separate series resistance-capacitance networks 67, 69 to the electrodes of diode 57.

In FIG. 1, only those portions of television receiver 21 which are necessary for an understanding of the operation of the test signal generator are illustrated. In the normal operation of the television receiver 21, the terminals B, B' associated with antenna 65 are connected directly to the external antenna terminals A, A' of receiver 21. Receiver 21 comprises an image-reproducing device such as a shadow mask color kinescope 71 for producing an image corresponding to image information contained in signals applied to antenna terminals A, A'. Luminance or brightness components of the image-representative signals are applied, for example, to cathodes of red, green and blue electron guns in kinescope 71, the three cathodes being represented diagrammatically by a single cathode 73 in FIG. 1. A variable resistance brightness control 75 is coupled, for example, to cathode 73 to control image brightness. An electromagnetic horizontal deflection winding 77 is associated with kinescope 71 and is supplied with a horizontal deflection waveform including relatively high amplitude flyback pulses.

In order to utilize the test signal generator in accordance with the present invention, the terminals B, B' are uncoupled from terminals A, A'. Terminals A and A' are coupled, respectively, to capacitors 61 and 63 while terminals B and B' are coupled, respectively, to networks 67 and 69—all external to the receiver 21. Lead 19, which may be simply a wire, is placed adjacent the receiver 21 in the vicinity of horizontal deflection winding 77 or kinescope 71 or the associated horizontal deflection circuits (not shown). When receiver 21 is operating, sufficiently high energy flyback pulses at the horizontal deflection frequency are present in any of these locations to induce current in lead 19 so as to synchronize operation of the test signal generator with the operation of television receiver 21.

The receiver 21 is tuned to an operating television broadcast channel such that a modulated radiofrequency carrier including horizontal and vertical synchronizing signals is received by antenna 65 and is coupled via networks 67, 69 and capacitors 61, 63 to receiver 21. The received signal level (normally of the order of millivolts) is substantially lower than the level required to render diode 57 conductive and is therefore processed by receiver 21 in a normal manner as though diode 57 were not present. Thus horizontal and vertical synchronizing signal components (at, for example, 15,734 Hz. and 59.94 Hz. respectively) are derived in receiver 21 from the received signal and a standard scanning raster is produced on the face of kinescope 71.

In the test signal generator, switch 13 is closed and operating voltage is applied to each of the active devices (transistors) by battery 11. Where the receiver under test operates with a line scanning frequency of 15,734.6 Hz. (U.S. standards), oscillators 23 and 25 are adjusted to produce trains of pulses, at for example, nominal frequencies of substantially 31,469 Hz. (2H) and 188,815 Hz. (12H), respectively. Each of oscillators 23 and 25 is synchronized to the operation of the horizontal deflection circuits in receiver 21 by means of pulses supplied via lead 19 and amplified in amplifier 17. The output of oscillator 23 is applied to relaxation oscillator 27. In oscillator 27, capacitor 31 alternately charges via a path comprising battery 11 and controls 35, 37, 33 and discharges via a path comprising control 33, resistor 39 and the emitter to first base electrodes of UJT 29. That is, capacitor 31 is gradually charged so as to produce an increasingly positive voltage between the emitter and first base electrodes of UJT 29, a voltage which is of a polarity tending to render UJT 29 conductive. At the same time, pulses are supplied to the second base electrode of UJT 29 from oscillator 23, the pulses also being of a polarity to render UJT 29 conductive. The charging time constant of capacitor 31 is adjusted by means of controls 35 and 37 such that every 35th pulse supplied by oscillator 23 causes UJT 29 to conduct. Capacitor 31 thereupon discharges through the path including pulse width control 33 and the emitter second base path of UJT 29. The discharge time constant and, hence, the output pulse width is adjusted by means of control 33. Output pulses produced across resistor 39 occur, for example, at a rate of 894 Hz. (15 pulses during each vertical scanning interval). These pulses are applied to "AND" gate 43 and are of a polarity to render transistor 45 conductive.

The output of oscillator 25 (188,815 Hz.) is shaped and amplified by amplifier 49 so as to supply pulses to transistor 47 at a rate of 12 pulses for each horizontal line interval. These pulses are of a polarity to render transistor 47 conductive. Upon the simultaneous occurrence of pulses at the inputs of transistors 45 and 47, an output pulse is produced at output terminal 53. Output pulses are produced at terminal 53 at a rate of 12 pulses per horizontal line during each of 15 evenly spaced horizontal line intervals. These output pulses are applied to normally nonconducting diode 57 and are of a polarity to render diode 57 conducting. When diode 57 conducts, an effective short circuit is placed across the input terminals A, A' of receiver 21 and the carrier wave supplied to receiver 21 is reduced to zero. As will be explained below, a bright white dot is produced on kinescope 71 each time diode 57 conducts (unless such conduction occurs during a normal blanking or retrace interval).

In the normal broadcast signal, maximum brightness image components are represented by approximately 85 percent modulation of the carrier wave (i.e. horizontal synchronizing pulses correspond to no modulation or 100 percent carrier amplitude while maximum white corresponds to 85 percent modulation or 15 percent of maximum carrier amplitude). Therefore, upon shorting the antenna terminals A, A' together, zero carrier level is supplied to receiver 21 which is represented on the screen of kinescope 71 as an image component whiter than maximum white of the broadcast image information. The desired dot test pattern thus may be displayed while excluding the received broadcast image information by reducing image brightness on kinescope 71 by means of brightness control 75 so that only the dot information supplied by the test generator is visible.

I claim:

1. Test signal-generating apparatus for producing test patterns for a television receiver of the type employing a pair of signal-receiving terminals for connection to an antenna, an image-reproducing device and scanning apparatus for scanning said device in first and second directions at respective first and second recurrence rates, said generating apparatus comprising means for deriving synchronizing signals from said scanning apparatus, pulse-generating means responsive to said synchronizing signals for producing pulses recurring in predetermined relation with respect to said first and second recurrence rates, and switching means coupled to said pulse-generating means and adapted for connection between said antenna and said pair of signal-receiving terminals for providing a low impedance across said receiving terminals in response to pulses produced by said pulse generating means.

2. Test signal-generating apparatus in accordance with claim 1 wherein said pulse-generating means is arranged for producing voltage pulses in timed relation determined by said first and second recurrence rates and of an amplitude greater than the voltage applied to said receiving terminals by signals received at said antenna, said switching means comprising voltage-responsive means insensitive to signal voltages from said antenna but responsive to said pulses of greater amplitude than said signal voltages to provide said low impedance.

3. Test signal-generating apparatus in accordance with claim 2 wherein said switching means comprises a diode adapted to be coupled across said receiving terminals poled to conduct upon the occurrence of pulses by said pulse-generating means.

4. Test signal-generating apparatus in accordance with claim 3 wherein said pulse-generating means produces first and second trains of pulses having respective recurrence rates equal to integral multiples of said first and second recurrence rates.

5. Test signal-generating apparatus in accordance with claim 4 wherein said first recurrence rate is equal to said line scanning rate and said first and second trains of pulses have respective recurrence rates equal to an integral multiple of said line-scanning rate and equal to an integral submultiple of twice said line-scanning rate.

6. Test signal-generating apparatus in accordance with claim 5 wherein said synchronizing signals recur at the line-scanning rate employed in said receiver.

7. Test signal-generating apparatus in accordance with claim 6 wherein said pulse-generating means comprises means responsive to simultaneous occurrence of pulses in said first and second trains of pulses for supplying a switching signal to said diode.

8. Test signal-generating apparatus in accordance with claim 7 wherein said first recurrence rate is equal to the line-scanning rate employed in said receiver and said first and second trains of pulses have respective recurrence rates equal to an integral multiple of said line-scanning rate and an integral submultiple of twice said line-scanning rate.

9. Test signal-generating apparatus for producing test patterns for a television receiver of the type employing a pair of signal-receiving terminals, an image-reproducing device, means for controlling the brightness of images produced on said device and scanning apparatus for scanning said device in first and second directions at respective first and second recurrence rates, said generating apparatus comprising means for deriving synchronizing signals at said first recurrence rate from said scanning apparatus, pulse-generating means responsive to said synchronizing signals for producing first and second trains of pulses having respective recurrence rates equal to integral multiples of said first and second recurrence rates, and switching means coupled to said pulse-generating means and between said pair of signal-receiving terminals for producing an input signal to said receiver in response to pulses produced by said generating means, said input signal corresponding to image brightness level greater than maximum image brightness components of a received broadcast signal.